J. A. JETER & G. McILROY.
BARREL MAKING MACHINE.
APPLICATION FILED JAN. 19, 1914.
1,147,509.
Patented July 20, 1915.
4 SHEETS—SHEET 1.
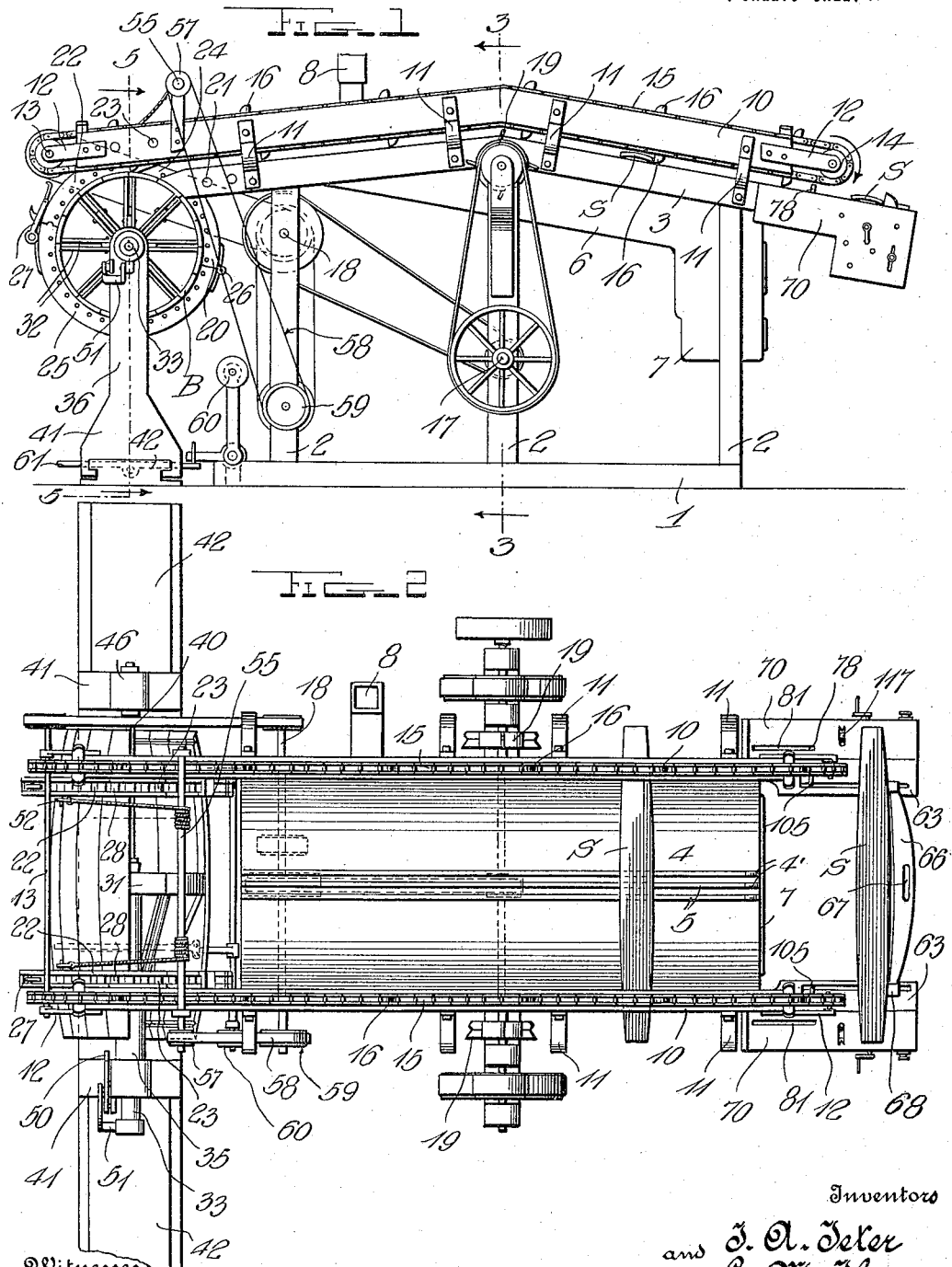

J. A. JETER & G. McILROY.
BARREL MAKING MACHINE.
APPLICATION FILED JAN. 19, 1914.
1,147,509.
Patented July 20, 1915.
4 SHEETS—SHEET 2.
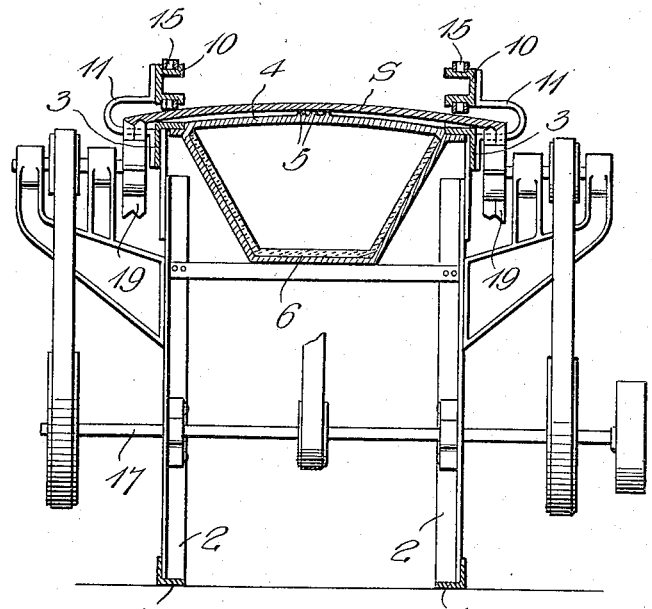
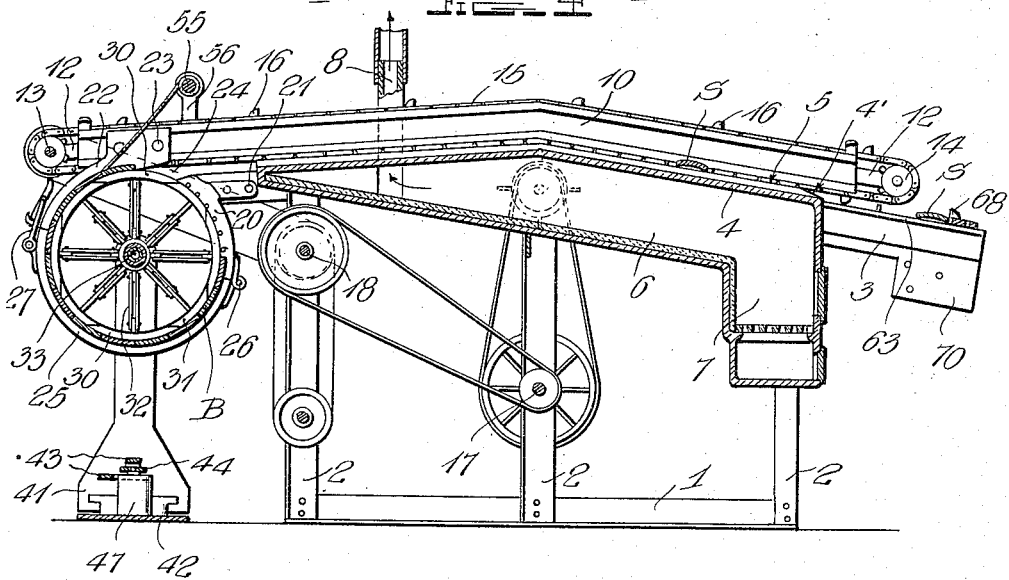
Witnesses
C. Munker
H. Woodard
Inventors
J. A. Jeter
G. McIlroy
By H. B. Willson &co
Attorneys

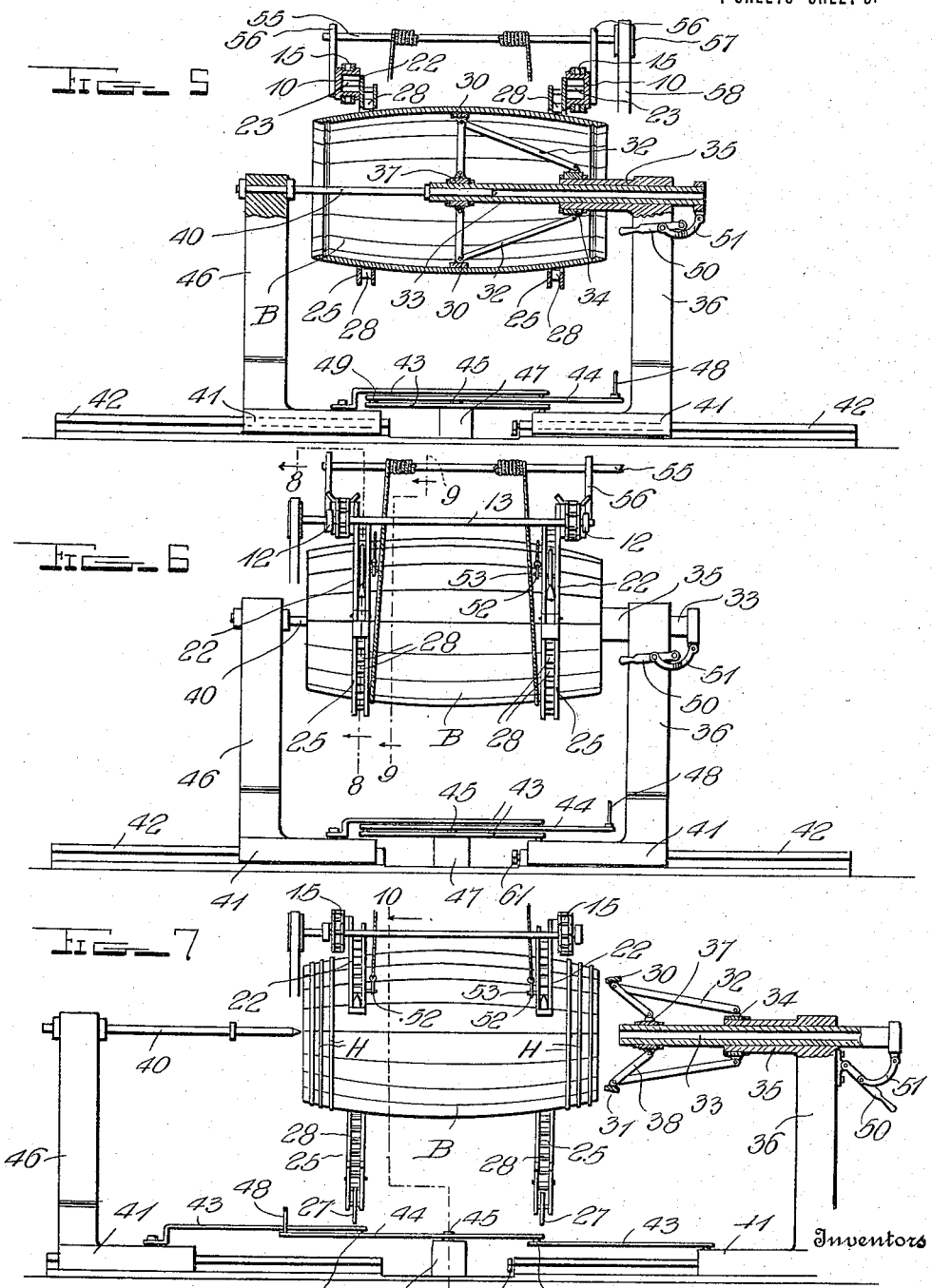

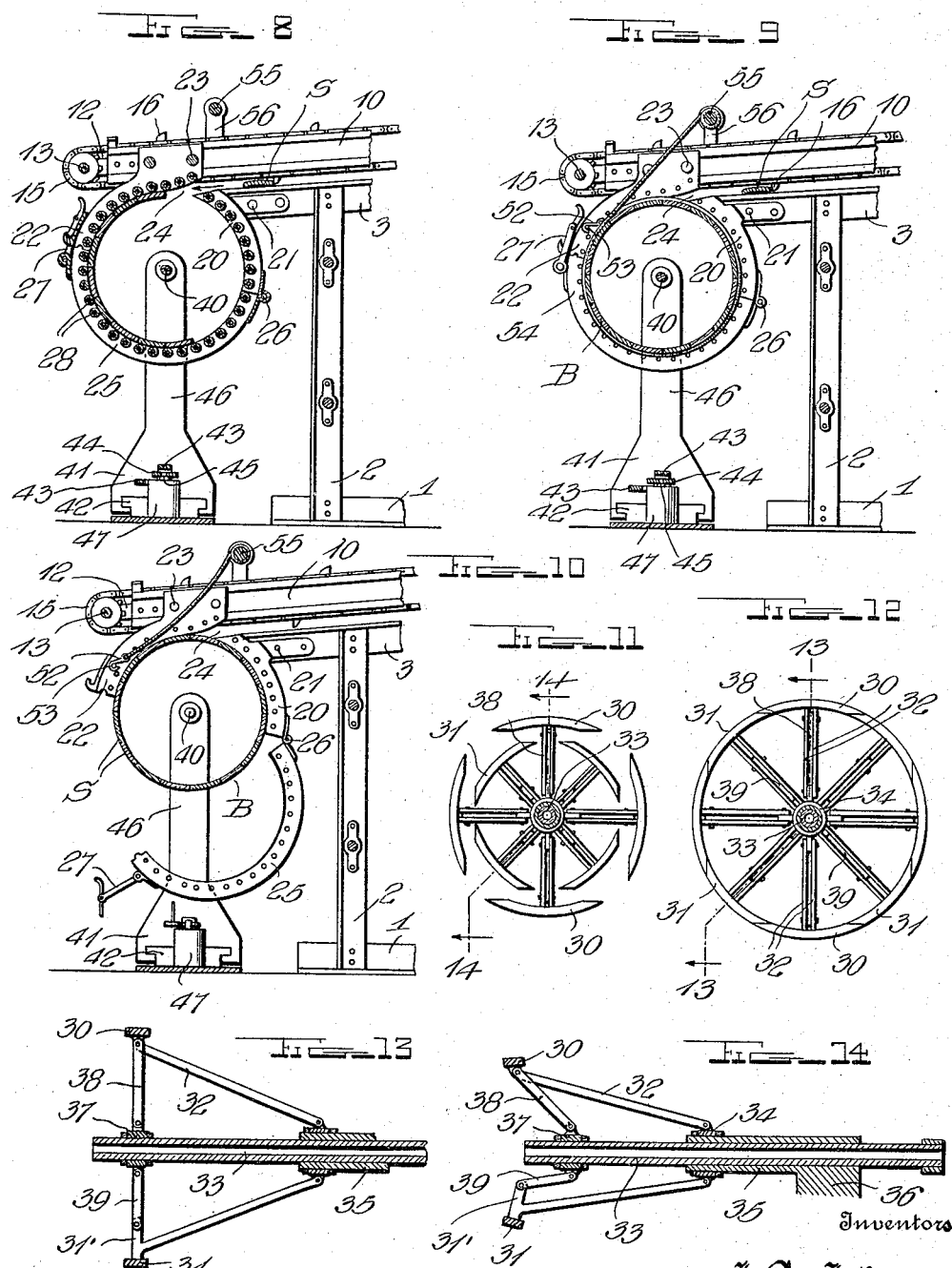

UNITED STATES PATENT OFFICE.

JOSIAH A. JETER AND GEORGE McILROY, OF SOUTH BELLINGHAM, WASHINGTON.

BARREL-MAKING MACHINE.

1,147,509.  Specification of Letters Patent.  Patented July 20, 1915.

Application filed January 19, 1914. Serial No. 812,979.

*To all whom it may concern:*

Be it known that we, JOSIAH A. JETER and GEORGE McILROY, citizens of the United States, residing at South Bellingham, in the county of Whatcom and State of Washington, have invented certain new and useful Improvements in Barrel-Making Machines; and we do declare the following to be a full, clear, and exact description of the invention, such as will enable others skilled in the art to which it appertains to make and use the same.

Our invention relates to coopering and more particularly to barrel making machines of the type having both stave feeding and stave assembling mechanisms.

The object of the present invention however, is to improve upon the assembling mechanism, in accomplishing which result and in applying the invention to use, we employ certain novel features of construction and combination hereinafter described and claimed and shown in the drawings wherein—

Figure 1 is a side elevation and Fig. 2 a plan view of this machine complete. Fig. 3 is a cross section on the line 3—3 of Fig. 1, and Fig. 4 is a central longitudinal sectional view. Fig. 5 is a cross section on the line 5—5 of Fig. 1. Figs. 6 and 7 are rear elevations illustrating the drum as in place in the former view and as withdrawn in the latter view. Figs. 8 and 9 are sections on the lines 8—8 and 9—9 respectively of Fig. 6, and Fig. 10 is a section on the line 10—10 of Fig. 7. Figs. 11 and 12 are end elevations of the drum in two different positions. Fig. 13 is a section on the line 13—13 of Fig. 12, and Fig. 14 a section on the line 14—14 of Fig. 11.

The framework of this machine is illustrated as comprising a pair of sills 1 from which rise legs 2 carrying lower side bars 3 which are preferably of L-iron and connected by an arched table 4 having a longitudinal ridge 5 along its center as best seen in Fig. 3. We prefer to incline these side bars from the front end of the machine (shown at the right of Fig. 1) slightly upward to about its midlength, from which point they descend slightly to the rear end of the machine. Thereby room is produced for a heater 6 best seen in Fig. 4, the fire being built in the fire box 7 and the products of combustion passing out the flue 8 after having been led along beneath the table 4 over which the staves S pass as seen in Fig. 3.

The endless stave carrier comprises a pair of upper side bars 10 connected with the lower side bars 3 by U-shaped brackets 11, bearings 12 at the extremities of said side bars, a shaft 13 through the rearmost pair of bearings and having sprocket wheels opposite the ends of the upper side bars, idle sprocket wheels 14 journaled in the foremost pair of bearings, and a pair of endless chains 15 traveling over said driving sprockets and idle sprockets and moving in the direction of the arrow in Fig. 1, the chains 15 having fingers 16 at suitable points and of a size to coact with the upper leaves of the lower side bars and carry the staves through the machine as will be clear. The main shaft 17 is connected by suitable belting—preferably through an intermediate countershaft 18— with a pulley on the shaft 13 so that power is communicated to the belts which form the endless carriage; and from other pulleys on said main shaft power is communicated to the crozing and chamfering cutters or knives 19 which act on the inner or under sides of the staves near their ends, as said staves pass over the apex of the lower side bars 3.

The barrel forming mechanism proper includes a cradle and a drum whose details are best seen on Sheets 3 and 4. The cradle is in two duplicate members, and we need describe but one. Each member is composed of three parts, an inner fixed part 20 which is secured as at 21 to the rear end of one of the lower side bars 3, an outer fixed part 22 which is secured as at 23 to the rear end of one of the upper side bars 10, this part being spaced at its upper end from the corresponding end of the part 20 to produce a throat 24, and a third or hinged lower part 25 which is connected with the inner fixed part 20 by any suitable form of hinge as at 26 and with the outer fixed part with any suitable form of latch as at 27. When the parts of either member of the cradle are brought together and latched as seen in Fig. 8 they form a complete circle with the exception of the throat 24 which opens toward the outlet end of the space between the upper and lower side bars 10 and 3, or in other words the carrier delivers the staves into this throat as indicated by the arrow in Fig. 8. Each part of each cradle member is made of like side bars or plates properly spaced and braced, and between them are disposed anti-friction rollers 28 so that the staves may move around on the interior of the member with ease. The members stand near opposite ends of the barrel as the latter is formed, and yet not so close to such ends that the hoops cannot be put onto the same— see Fig. 7.

Although the manner in which the heater beneath the means for conveying the staves to the assembling mechanism is designed to operate, would probably be understood by those skilled in the art to which the invention relates, it may be well to give the following explanation:—The staves S are soaked or steamed before they are fed to the conveyer to be grasped by the fingers 16 but, in view of the fact that the steaming or soaking is often done at a point remote from the assembling machine, and since it is a well known fact that the staves may be more readily bent and moved into proper position when they are heated, the heating mechanism has been provided below the table 4. As the staves are passed over said table, their central portions ride up the inclined front end of the ridge 5 and travel upon said ridge throughout their course from the front end of the machine to the rear end thereof at which the assembling mechanism is located. During this rearward movement, the ends of the staves are held in planes below the ridge 5, by the conveying chains 15 and the upper side bars 10 as will be readily understood. It will therefore be seen that the staves are simultaneously bent and heated, and that this heating tends to dry the outer surface of the staves thereby causing them to contract to practically their normal size, it being a well known fact that the staves swell or expand when steamed or soaked. It is essential that the staves be bent, it is highly desirable that they be heated and it is expedient that they be partially dry, since when in this last mentioned state, less contraction of the completed barrel will take place, thereby causing tighter joints between adjacent staves. By the construction above described and illustrated in the accompanying drawings, it will be seen that the bending, heating and partial drying is accomplished simultaneously. This idea in a barrel forming machine as well as the structure for reducing the idea to practice, represents a marked advance over other devices of this character now on the market.

The drum which coöperates with this cradle to shape the barrel as the latter is formed, has a cylindrical head which stands within the bilge of the barrel when the head is distended, but the latter is capable of being collapsed as seen in Fig. 11 so that the entire drum can be drawn longitudinally from the barrel as seen in Fig. 7. Said head is made up of outer rim segments 30 and inner segments 31, all suitably beveled at their ends so that the inner segments may be projected last and drawn inward first in the act of distending or collapsing the head. The several outer segments are mounted on arms 32 which converge toward each other as they extend along a tubular shaft 33, and their inner ends are pivoted to a collar 34 which rotates in a groove around a sleeve 35 carried by a standard 36, and through which sleeve the shaft is longitudinally movable. In a groove around said shaft near its inner end rotates another collar 37 which is pivotally connected by links 38 with the outer segments 30 and by shorter links 39 with ears 31' projecting inward from the inner segments 31. With this construction, when the shaft 33 is pushed inward as seen in Fig. 13, the links 38 and 39 stand in the plane of the head and all the rim segments are distended so that the rim is complete as seen in Fig. 12. When the shaft 33 is drawn to the right or outward as seen in Fig. 14, the inner collar 37 moves with it and the short links 39 cause the inner segments 31 to move inward first as seen in Fig. 11, after which the long links 38 cause the outer segments 30 to move inward to collapse the head. In either position of parts, the two collars can rotate in the two grooves around the sleeve and shaft respectively, so that the drum as a whole can turn with the staves S as they are fed into the cradle.

A pin 40 stands in line with the bore of the tubular shaft 33 and is mounted on another standard 46 at the opposite side of the machine as seen in Fig. 7. The standards are provided with feet 41 which are slidably mounted on guides 42 at the rear end of the entire machine, and the feet are connected by links 43 with a rock lever 44 which is pivoted at 45 on a block 47 and has any suitable form of handle 48. When this handle is moved from the position shown in Fig. 7 to the position shown in Fig. 6, the pivotal points 49 draw on the links 43 and the latter in turn draw the feet 41 inward. This causes the two standards to move simultaneously toward each other with the result that the tip of the pin 40 is projected into the inner end of the tubular shaft 33 as seen in Fig. 5. Thereafter the shaft may be moved through the head of the standard 36 and along the length of the sleeve 35 by any suitable mechanism such as the hand lever 50 and link 51 connecting it with the outer end of the tubular shaft 33. The fact that the latter is rigidly carried by a sleeve 35 in the upper end of one standard and its inner end braced by the pin 40 carried at the upper end of the other standard, centers the drum accurately within the barrel being formed and maintains the bilge on the staves as they are put in place within the cradle.

The contracting or cinching ropes are by preference two in number and duplicates, and we need describe but one. One extremity carries a hook 52 adapted to be engaged with a pin 53 on the outer fixed part 22 of the contiguous cradle-member, whence the rope passes around the barrel B as it is being formed, as indicated at 54 in Fig. 9, and the other end of the rope is led over a windlass 55 which in the present instance is a shaft journaled in standards 56 rising from the carrier-frame as seen in Fig. 6. One end of this shaft carries a pulley 57 connected by a belt 58 with an idle pulley 59 which in turn is connected with the counter shaft 18 in any suitable way. A belt tightener 60 is mounted on one of the sills 1 in position to increase the tension of the rather loose belt 58, and this belt tightener is actuated by a treadle 61 of any suitable type, the treadle by preference projecting between the two guides 42 and alongside the block 47 so that the operator who stands at this (the rear) end of the entire machine, may manipulate this treadle and the belt tightener. When the latter is not in active use the belt 58 is loose and this operator may draw on the ropes, pass them around the barrel, and engage their hooks with the pins in the cradle.

With a machine as thus far constructed, the staves S are fed into the forward end of the carrier and by the latter moved along over the heater and the cutter heads, being finally delivered through the throat 24 into the cradle. At this time the drum stands within the latter and distended as seen in Fig. 4, and the result is that the staves pass around the drum and inside the anti-friction rollers 20 of the cradle and fill the latter— the number of staves and their width being dependent on the size of barrel being made, and this detail being controlled by the size of cradle and drum employed. After the last stave has been put in place mechanically, the operator at the rear end of the machine applies the cinching ropes and manipulates the treadle to oscillate the belt tightener, when the windlass draws on said ropes and the staves are drawn very tightly together to shape up the barrel as seen in Fig. 6. The lever 50 is then manipulated to collapse the head of the drum and the lever 48 manipulated to spread the standards 36 and 46 apart so that the entire drum is removed from the interior of the barrel—the hoops H being meanwhile applied as seen in Fig. 7. The operator then relaxes and removes the ropes, and by unlatching the members of the cradle as at 27 permits the lower parts 25 thereof to drop and the finished barrel falls out of the machine.

In addition to the above the following details are preferably employed: The front end of the main table 4 is beveled as at 4' but the lower side bars 3 project beyond this beveled end to form extension tables as at 63. The numeral 66 designates a push bar having at its center a hand hold 67 and at each end an upstanding finger 68 adapted to engage the rear edge of the stave S as seen in Fig. 2 as the push bar is moved rearward by the operator standing at this which is the front end of the machine. It is obvious that if he pushes the stave far enough rearward over the extension tables 63 to permit it to be grasped by the fingers 16 on the chains 15, it will be conveyed to the assembling mechanism. In thus moving rearwardly over the tables 63, the stave S comes in contact with a pair of fingers 78 rising through slots 81 in a pair of casings 70, said fingers actuating suitable means within said casings for measuring the width of the stave, such width being preferably displayed upon a table beneath openings 117 in the tops of said casings (see Fig. 2). Since this measuring means forms no part of the present application, further description and illustration thereof is thought to be unnecessary.

What is claimed as new is:

1. The combination with a pair of spaced rings, and means for conveying staves thereto, of a contractible head positioned between said rings and designed to hold the staves in contact therewith, and a laterally movable standard upon which said head is mounted.

2. The combination with a pair of spaced rings, and means for conveying staves thereto, of a pair of laterally movable standards adjacent said rings, a contractible head mounted upon one standard and positioned between the rings to hold the staves in contact therewith, and a centering device carried by the other standard and projecting through the adjacent ring, said device being designed to center the head within the barrel being formed.

3. The combination with a pair of spaced rings, and means for conveying staves thereto, of a pair of standards spaced laterally from the rings, said standards being movable toward and away from said rings, a contractible head carried by one standard and located between the two rings to hold the staves in contact therewith, said head having a socket at its center, and a centering pin rigidly secured to and projecting inwardly from the other standard into said socket whereby to retain the head concentric with the rings.

4. In a barrel making machine, the combination with a circular cradle and a standard spaced from one end thereof and having a tubular bearing alining with the axis of the cradle, of a shaft mounted in the bearing to slide inwardly and outwardly, arms pivotally connected at their outer ends with said bearing and diverging inwardly therefrom, the inner ends of said arms being equipped with shoes, and toggle links connecting the arms and the inner end of the shaft.

5. In a barrel making machine, the combination with a circular cradle, a standard spaced from one end thereof and having a tubular bearing alining with the axis of the cradle, of a shaft mounted in the bearing to slide inwardly and outwardly, a plurality of arms pivotally connected at their outer ends with said bearing and diverging inwardly therefrom, the inner ends of said arms being equipped with circumferentially spaced arcuate shoes, toggle links connecting said arms and the inner end of the shaft, additional arcuate shoes interposed in the spaces between the first mentioned shoes, additional arms converging outwardly from said additional shoes and pivotally connected with the bearing, and additional and shorter toggle links connecting the additional arms and the inner end of the shaft.

6. In a barrel making machine, the combination with a circular cradle and a standard spaced from one end thereof and having a tubular bearing alining with the axis of the cradle, of a shaft mounted in the bearing to slide inwardly and outwardly, a plurality of arms pivotally connected at their outer ends with said bearing and diverging inwardly therefrom, the inner ends of said arms being equipped with circumferentially spaced arcuate shoes, toggle links connecting said arms and the inner end of the shaft, additional arcuate shoes interposed in the spaces between the first mentioned shoes, additional arms converging outwardly from said shoes and pivotally connected with the bearing, inwardly extending ears on said additional arms, and additional and shorter toggle links connecting said ears and the inner end of the shaft.

In testimony whereof we have hereunto set our hands in presence of two subscribing witnesses.

JOSIAH A. JETER.
GEORGE McILROY.

Witnesses:
ETHEL JETER,
C. A. CONLEE.

Copies of this patent may be obtained for five cents each, by addressing the "Commissioner of Patents, Washington, D. C."